United States Patent [19]

Recker

[11] 4,289,414
[45] Sep. 15, 1981

[54] TORQUE TRANSMITTING COUPLING

[76] Inventor: Florian B. Recker, 802 First St., Dyersville, Iowa 52040

[21] Appl. No.: 100,826

[22] Filed: Dec. 6, 1979

[51] Int. Cl.³ ............................................. F16B 7/00
[52] U.S. Cl. ..................................... 403/12; 403/17; 403/325; 403/328; 64/6
[58] Field of Search ................ 403/328, 322, 325, 13, 403/359, 316, 317, 318, 12, 17; 64/6, 4, 32 R

[56] References Cited

U.S. PATENT DOCUMENTS

| | | | |
|---|---|---|---|
| 2,673,750 | 3/1954 | Scheiwer | 285/277 |
| 3,551,013 | 12/1970 | Trojanowski et al. | 403/317 |
| 3,747,966 | 7/1973 | Wilkes | 403/325 |
| 3,969,033 | 7/1976 | Recker | 403/322 |
| 3,990,550 | 11/1976 | Recker | 403/325 X |
| 3,992,119 | 11/1976 | Recker | 403/359 X |
| 3,992,120 | 11/1976 | Recker | 403/359 X |
| 4,125,337 | 11/1978 | Recker | 403/359 X |

*Primary Examiner*—Andrew V. Kundrat
*Attorney, Agent, or Firm*—Henderson & Sturm

[57] ABSTRACT

A torque transmitting coupling including a housing, an opening in the housing, a portion of the opening being non-circular, the opening further being adapted to receive a non-circular portion of a shaft. Locking structure is provided for selectively locking the non-circular portion of the shaft into the opening in the housing, such locking structure being biased to a locked position and selectively movable to an unlocked position. The locking structure includes a plurality of bores radially disposed in the housing, a locking element slidably disposed in each of the bores and being radially movable from an inner, locking position, wherein the elements are engageable within the recess of the shaft to thereby prevent relative axial movement of the housing with respect to the shaft; and, an outer, unlocked position, whereby the elements permit relative axial movement of the housing and the shaft. An annular cam is slidably disposed around the housing and is axially movable between a first position holding the locking elements in their locking position and a second position allowing the locking elements to move to their unlocked position. A biasing spring causes the cam to move to the first position thereof. A forward free spinning guard is rotatably disposed around the housing for preventing human contact with the housing when the housing is locked onto the shaft. An adjusting mechanism is rotatably fixed to the forward guard around the housing and is disposed between the housing and the guard for selectively moving the cam from the first to the second position thereof. The adjusting mechanism has a plurality of depressions around the periphery thereof for contacting the locking elements when the locking elements are in the unlocked position thereof, whereby rotation of the guard means causes rotation of the housing and whereby the opening in the housing can be aligned with the shaft for placing the housing over the shaft.

10 Claims, 12 Drawing Figures

TORQUE TRANSMITTING COUPLING

BACKGROUND OF THE INVENTION

The present invention relates generally to shaft couplings and more particularly to a shaft coupling for transmitting a torque force from one shaft to another.

The problem of how to couple one shaft to another for transmitting a torque force is a long standing one. This has particularly been a problem in the farming community wherein the power take-off of an agricultural tractor frequently needs to be connected and disconnected to utilize one implement and then another. This problem has been solved in the past in one degree or another and one of the most commercially successful of these solutions is a connection of the type disclosed in U.S. Pat. No. 3,747,966 to Wilkes et al. issued in 1973. The commercial success of the coupling of this Wilkes et al. patent has been excellent, but even a quick view of the patent discloses many parts which need to be made and a considerable number of grooves and holes, all of which lead to additional cost and, to some extent, a complicated operation for use.

To operate the coupler of the Wilkes et al. patent referred to above, assuming that the drive train connected thereto is desired to be connected to the power take-off shaft of a tractor, the safety guard of the coupler must be pulled rearwardly to overcome the bias of a spring to allow the coupling elements to permit the coupler to be placed over the power take-off shaft, and while this rearward pulling is accomplished, the operator must also forwardly pull a very heavy drive train having telescoping parts which also add to the drag which must be overcome; and, once the coupler is placed over the power take-off shaft, then the guard can be released so that the coupling elements engage and lock the coupler to the power take-off shaft of the tractor.

If it happens that the splines of the coupler are not aligned with the splines of the power take-off shaft, which happens in a very large percentage of cases, then, in addition to the operation referred to above, a button must be pushed down in the Wilkes et al. coupler and the guard turned while pushing the button down, until a hole in the coupler housing is engaged. Once this has been done, the entire coupling housing may be rotated at the same time that the guard is being pulled back to keep coupler in an unlocked position; and, at the same time that the entire drive chain is being pulled forward in an opposite direction, whereby the coupler can be aligned with the splines of the shaft to complete the coupler operation as described above.

As can be readily appreciated from the above description of the operation of one of the most commercially successful coupling devices on the market today, there is a need for a coupler with a simplified operation for use.

SUMMARY OF THE INVENTION

The present invention relates to a torque transmitting coupling including a housing, an opening in the housing, a portion of the opening being non-circular, the opening further being adapted to receive a non-circular portion of a shaft. Locking structure is provided for selectively locking the non-circular portion of the shaft into the opening in the housing, such locking structure being biased to a locked position and selectively movable to an unlocked position. The locking structure includes a plurality of bores radially disposed in the housing, a locking element slidably disposed in each of the bores and being radially movable from an inner, locking position, wherein the elements are engageable within the recess of the shaft to thereby prevent relative axial movement of the housing with respect to the shaft; and, an outer, unlocked position, whereby the elements permit relative axial movement of the housing and the shaft. An annular cam is slidably disposed around the housing and is axially movable between a first position holding the locking elements in their locking position and a second position allowing the locking elements to move to their unlocked position. A biasing spring causes the cam to move to the first position thereof. A guard is rotatably disposed around the housing for preventing human contact with the housing when the housing is locked onto the shaft. An adjusting mechanism is fixed against rotation with respect to the guard around the housing and is disposed between the housing and the guard for selectively moving the cam from the first to the second position thereof. The adjusting mechanism has a plurality of depressions around the periphery thereof for contacting the locking elements when the locking elements are in the unlocked position thereof, whereby rotation of the guard means causes rotation of the housing and whereby the opening in the housing can be aligned with the shaft for placing the housing over the shaft.

An object of the present invention is to provide an improved coupling device for transmitting a torque force from one shaft to another.

Another object of the invention is to provide an improved coupling device which is economical to manufacture.

A further object of the invention is to provide an improved coupling device which is simple and dependable to use.

Still another object of the invention is to improve and simplify a coupling apparatus which has been proven to be dependable and is commercially successful.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
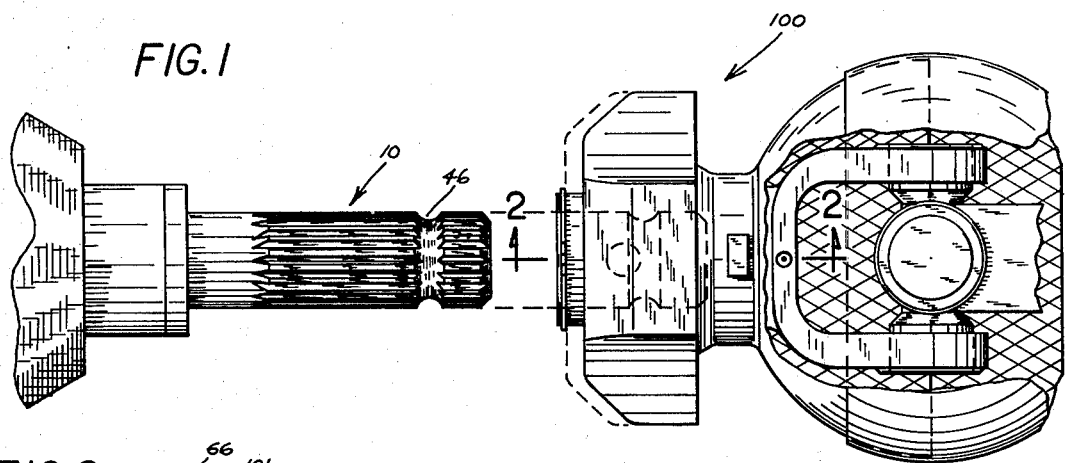
FIG. 1 is a side elevational view of the power take-off shaft of a tractor and one embodiment of the present invention shown in readiness to be placed onto such power take-off shaft.

Referring now to the drawings wherein like reference numerals designate identical or corresponding parts throughout the several views, FIG. 1 shows a first preferred embodiment 100 shown in readiness to be connected to a power take-off shaft 10 of a tractor. It is noted that to the extent that this disclosure has parts identical to that shown in the Wilkes et al. U.S. Pat. No. 3,747,966 that such numbers are identically numbered with that patent and such patent is incorporated herein by reference, since this invention is an improvement of U.S. Pat. No. 3,747,966. To distinguish between what is in common with that shown in the Wilkes et al. patent and that which has been added, the present invention will use one hundred series numbers only for that which is new and will use the same numbers as used in the Wilkes et al. patent for those things which are shown and described therein.

In the first embodiment 100 as shown in FIGS. 1-5, it is noted that a washer member 101 is welded to the member 56 and this washer member 101 has a plurality of arcuate shaped cuts 102 taken out of the inner periphery thereof. These arcuate cuts 102 are substantially of the same or slightly larger diameter than the locking ball elements 42 as can be clearly seen in FIG. 4.

Figure 2:
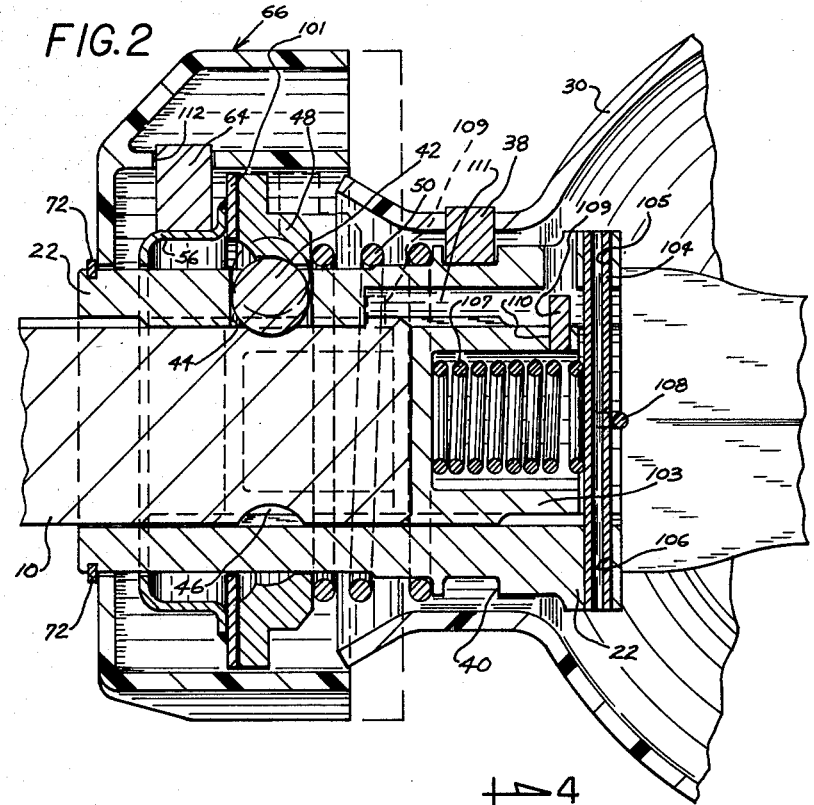
FIG. 2 is a cross sectional view taken along line 2—2 of FIG. 1.
Figure 3:
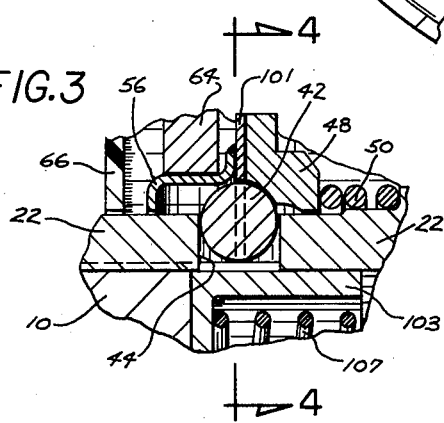
FIG. 3 is an enlarged cross sectional view of a portion of what is shown in FIG. 2, but showing the apparatus in a locked open position and in a position whereby rotation of the guard means will cause rotation of the housing of the coupler.
Figure 4:
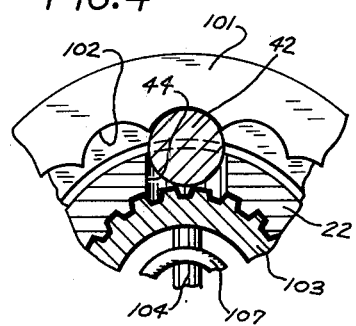
FIG. 4 is an enlarged partial cross sectional view taken along line 4—4 of FIG. 3.

A follower element 103 can be seen in FIGS. 2-4. This follower element 103 has splines and grooves thereon which are substantially like the splines and grooves of the shaft 10 so that they mate with the internal splines and grooves on the internal opening of the housing 22.

A roll pin 104 as is shown in FIG. 2 is disposed through a pair of holes 105 and 106 which have been bored through the housing 22 for the purpose of receiving such roll pin 104. A spring 107 is disposed within the follower member 103 and is of a compression type for the purpose of biasing the follower member 103 to a left-most position as viewed in FIG. 2 whereby the follower member 103 will be approximately in the position shown in FIG. 3 whereby it covers up the openings 44 passing through the housing 22 when the shaft 10 is removed as is shown in FIG. 3 and in dashed lines in FIG. 2. A loop 108 on one end of the compression spring 107 is disposed around the roll pin 104 for the purpose of preventing the member 103 from moving too far to the left as viewed in FIG. 2, it being noted that the left end most coil of the spring 107 is attached, such as by welding, to the left-most inside end of the follower member 103. Alternatively or cumulatively, a pin member 109 may be placed into an opening 110 in the follower member 103 (FIG. 2) and this pin 109 would be received in a groove 111 in the housing 22 whereby the pin 109 could not move to the left beyond the position shown in dashed lines in FIG. 2; and, consequently, the follower member 103 cannot move to the left more than the position shown in dashed lines in FIG. 2 for this reason as well. It will clearly be understood to those skilled in this art that the follower member 103, along with the pin 109 and spring 107, must be inserted into the opening in the housing 22 prior to insertion of the roll pin 104, whereby the roll pin 104 locks the follower member 103 and its associated structure into the opening within the housing 22.

In operation of the first coupler embodiment 100 of the present invention, the tractor having the power take-off shaft 10 connected thereto would be backed up to an implement having a drive train with the coupler 100 connected thereto. The operator of the tractor would then disengage the power take-off on the tractor such that the shaft 10 would not be rotating. Such tractor operator would then grasp the coupler 100, which would be in the position shown in solid lines in FIG. 1 because it would be locked open due to the position of the follower member 103. The coupling 100 would then be moved forwardly onto the power take-off shaft 10; and, if the splines of the opening of housing 22 were not in alignment with the splines and groove of the power take-off shaft 10, then merely by grasping the guard 66 and rotating it one way or the other, the splines and grooves of the opening of the housing 22 could be aligned such that the coupler 100 can be received over the power take-off shaft 10. Once the housing 22 of the coupler 100 has been moved to the position shown in solid lines in FIG. 2 with respect to the power take-off shaft 10, such that the groove 46 of the power take-off shaft 10 is aligned with the locking ball elements 42 of the coupler 100, then the cam 48 will bias the balls 42 downwardly into the groove 46 through spring 50, thereby causing the coupler 100 to be locked onto the power take-off shaft 10. It is important to note that during the rotation of the guard 66 to align housing 22 with the power take-off shaft 10 that the guard 66 must be in the position shown in solid lines in FIG. 1, which corresponds to the position of the washer 101 of FIGS. 3 and 4 whereby the notches or depressions 102 are disposed around the locking ball members or elements 42, thereby allowing the housing 22 to thereby be rotated. This is because the housing 22 is locked against rotation with respect to the ball 42, the washer element 101 is locked against rotation with respect to the member 56, the member 56 is rigidly attached to the member 64 which is, in turn, locked against rotation with respect to the guard element 66 because it is disposed in an opening 112 in the guard 66.

Figure 5:
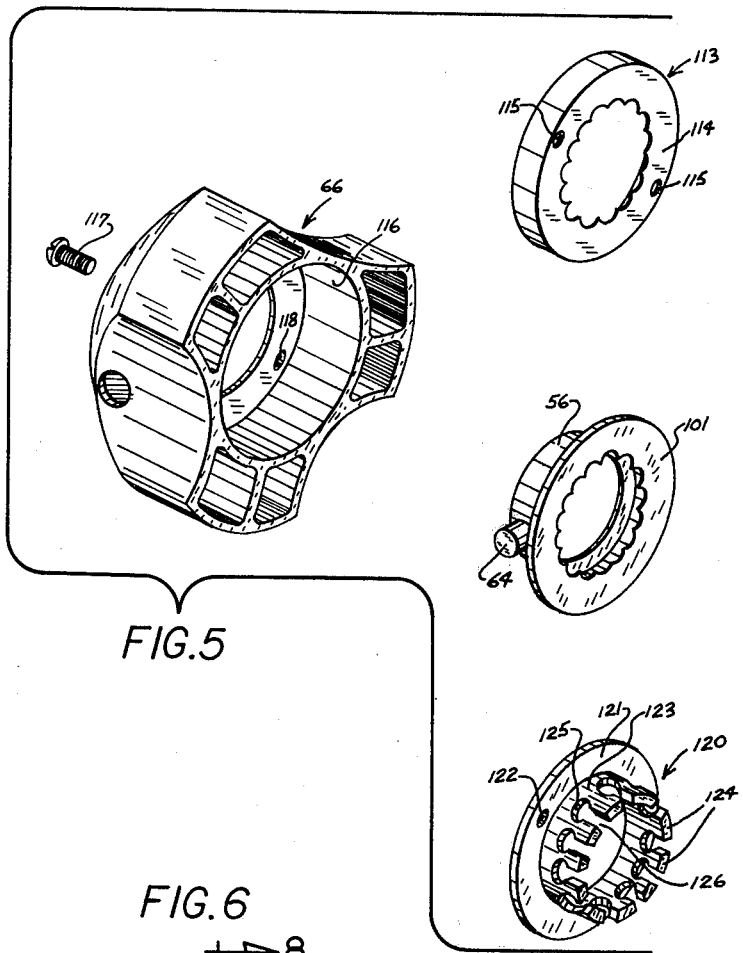
FIG. 5 is an exploded view of the guard structure of the first three embodiments of the present invention, the three parts to the right of the guard member being alternate embodiments, the centermost of the three rightmost embodiments being the embodiment shown in FIGS. 1-4.
Figure 6:
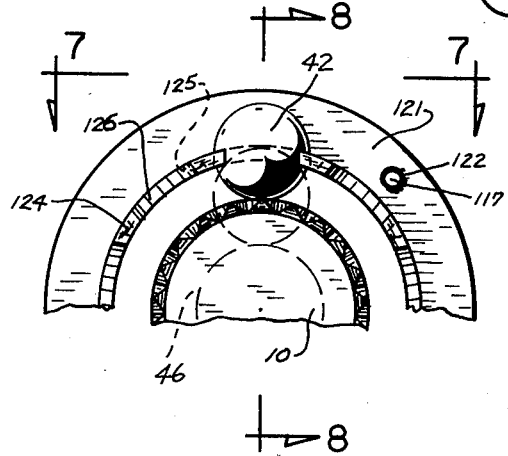
FIG. 6 is a view like FIG. 4, but showing the embodiment like the bottom-most embodiment of FIG. 5.
Figure 7:
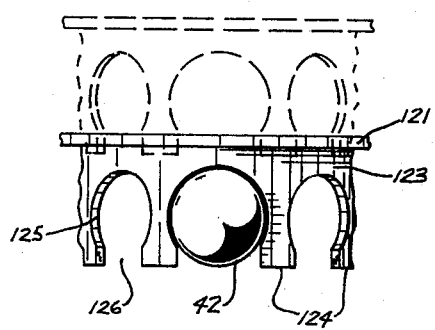
FIG. 7 is a view taken along line 7—7 of FIG. 6, showing an embodiment wherein the fingers engage the ball elements whereby the guard can be used to rotate and adjust the position of the housing of the coupling in solid lines and, in dashed lines, the position of the adjusting structure of such embodiment with respect to the ball elements when the coupler is in the locked position with the cam holding the locking elements down.
Figure 8:
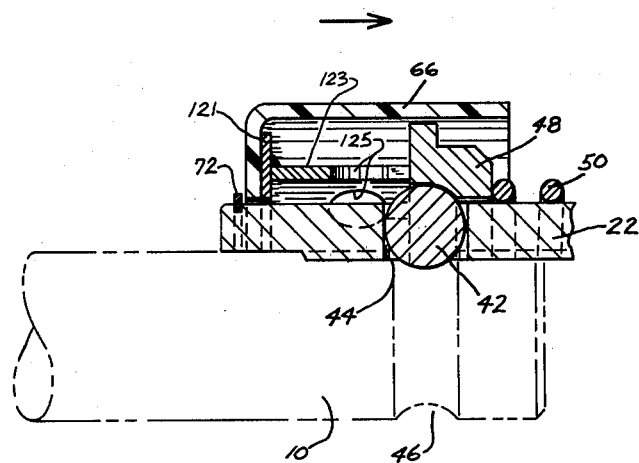
FIG. 8 is a cross sectional view taken along line 8—8 of FIG. 6 showing the locking elements in a locked relationship with respect to the power take-off shaft.
Figure 9:
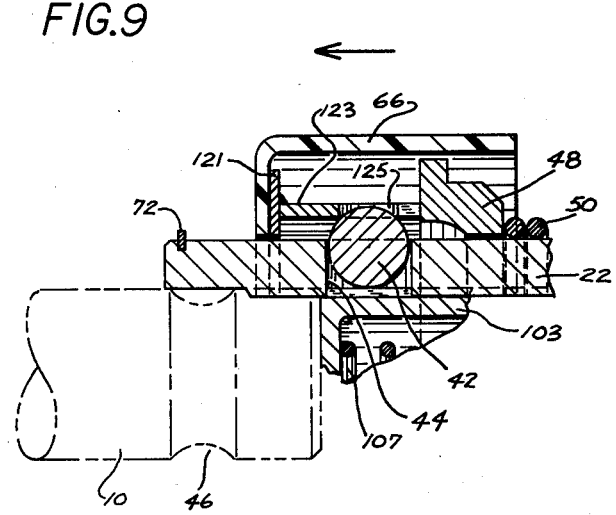
FIG. 9 is a cross sectional view, like FIG. 8, but showing the coupler in an unlocked position with the coupler in a stage of being removed from the power take-off shaft.

Referring now to the second embodiment shown at the top right corner of FIG. 5, it is noted that a member 113 is shown having a front face 114 which is substantially identical in shape to the washer 101 of the first embodiment except for the presence of openings 115 therein. This member 113 is received in the opening 116 in the guard 66 and bolts 117 are utilized to connect member 113 to guard 66 by passing through openings 118 in such guard 66 and being threaded into the openings 115 of member 113. The operation of the member 113 is identical to the above described operation of the first coupler embodiment 100.

Referring now to the third embodiment shown in FIGS. 6-9 and in the lower right-hand corner of FIG. 5, it is noted that this third embodiment utilizes a member 120, including a washer 121 having openings 122 on each side thereof so that the washer 121 can be affixed to the guard 66 by utilization of bolts 117 and openings 118 in the guard 66. A sleeve member 123, including longitudinally extending finger members 124, is rigidly attached to the washer 121, such as by welding. These finger members 124 are formed by means of a bore 125 and a cut out section 126, although it is to be understood that these finger members 124 can be formed in other ways and can be of other configurations and still be quite operative.

The operation of the third embodiment is identical to the above described operation with respect to the first embodiment 100, except that it is not necessary to move the guard 66 to the position shown in solid lines in FIG. 1 for the third embodiment 120 of FIG. 6-9 to operate. As long as the coupler of the third embodiment is in an unlocked position, such as that shown in FIG. 9, the balls 42 will be locked between adjacent fingers 124 thereby allowing the housing 22 opening to be readily aligned with the power take-off shaft 10 by merely turning the guard 66. This does not detract from the free spinning safety feature of the guard 66 because the housing 22 will not be rotating when the locking ball elements 42 are not locked radially inwardly, because the shaft 10 will not be rotating. On the other hand, this serves an additional advantage by requiring one less step in the operation of the coupler.

Figure 10:
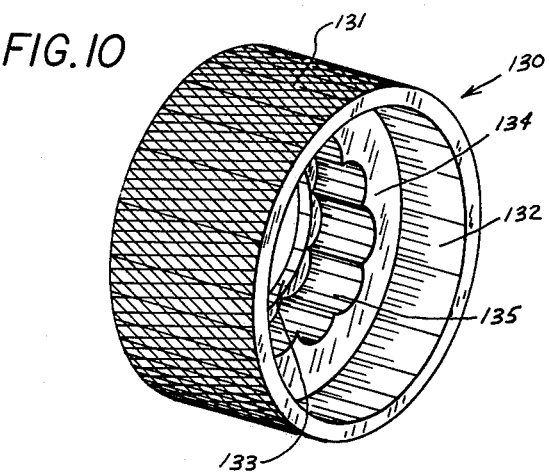
FIG. 10 is a fourth embodiment of the present invention showing a perspective view of an integrally formed guard structure and adjusting structure.
Figure 11:
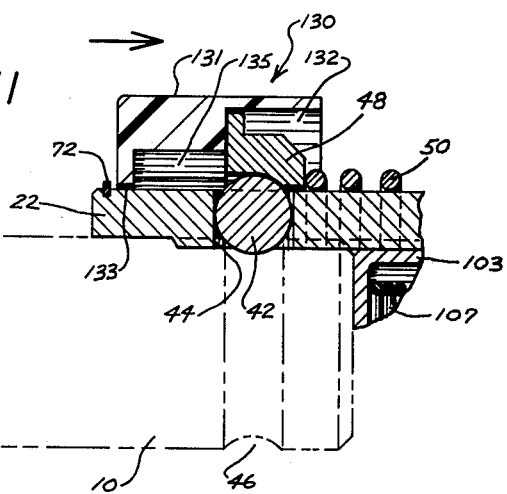
FIG. 11 is a cross sectional view of such fourth embodiment, similar to the embodiment and view of FIG. 8, showing the coupler locked onto a power take-off shaft.
Figure 12:
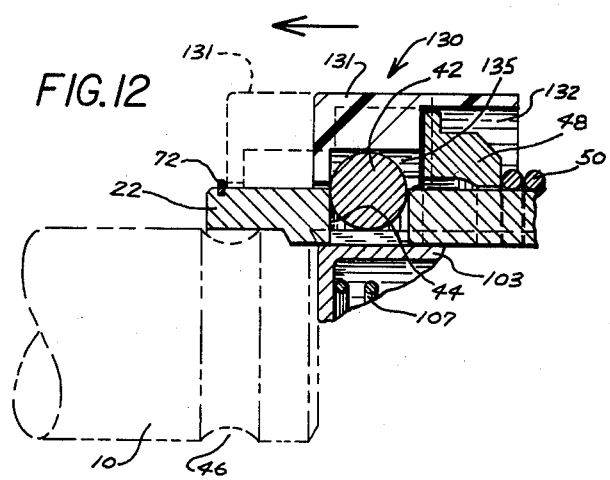
FIG. 12 is an enlarged partial cross sectional view like FIG. 11, but showing the fourth embodiment in an unlocked position wherein the guard and adjusting mechanism are in engagement with the locking ball elements whereby the housing of the coupler can be readily rotated to align the opening of the coupler with the splines of the power take-off shaft.

Referring now to the fourth embodiment 130 of FIGS. 10-12, it is noted that the guard and adjusting mechanism have been combined into an integral unit. A knurled surface 131 is shown, although the particular type of surface is not critical. This member 130 has a first inner periphery 132 which is large enough to receive the cam 48 and an innermost radius 133 which is just large enough to slidably be received over the housing 22. Between the large and small inner peripheries 132 and 133, respectively, is a structure 134 having a plurality of longitudinally disposed arcuate depressions or grooves 135 therein. The operation of the device 130 shown in FIGS. 10-12 is identical to the operation of the third embodiment described above with respect to FIGS. 6-9 and is identical to the above description of the operation of the first embodiment 100 shown in FIGS. 1-4, except that whenever the locking ball elements 42 are in the unlocked position as shown in FIG. 12, then the member 130 can be used to rotate the housing 22 in any axial position thereof; and, when the locking ball elements 42 are in the position shown in FIG. 11, whereby they are locked radially inwardly by the cam 48 into the depression 46 in power take-off shaft 10, then the guard 130 is free spinning to afford the safety feature needed to prevent the operator thereof from getting his body or clothing "wrapped-up" in such rotating structure.

Accordingly, it is believed to be clear that the above described embodiments do indeed accomplish all of the objects referred to above. Obviously many modifications and variations of the present invention are possible in light of the above teachings. For example, the elements 113, 101, 120 and 130 can be constructed in many different ways and of many different materials. They can, for example, be molded in one piece with the guard, such as in element 130, or made as separate elements to be connected together. It is therefore to be understood that, within the scope of the appended claims, the invention may be practiced otherwise than as specifically described.

I claim:

1. A torque transmitting coupling comprising:

a housing;

an opening in said housing, a portion of said opening being non-circular, said opening being adapted to receive a non-circular portion of a shaft;

means for selectively locking the non-circular portion of said shaft into the opening in said housing, said locking means being biased to a locked position and selectively movable to an unlocked position;

said locking means comprising a plurality of bores radially disposed in said housing and a recess in said shaft, a locking element slidably disposed in each of said bores and radially movable from an inner, locking position, wherein the elements are engageable within the recess of said shaft to thereby prevent relative axial movement of the housing with respect to the shaft and an outer, unlocked position, whereby the elements permit relative axial movement of the housing and the shaft, an annular cam means slidably disposed around said housing and being axially movable between a first position holding the locking elements in their locking position and a second position allowing the locking elements to move to their unlocked position and means for biasing said cam means to said first position;

guard means rotatably disposed around said housing for preventing human contact with said housing when the housing is locked onto said shaft;

adjusting means attached to said guard means and around said housing and disposed between the housing and the guard means for selectively moving said cam means from the first to the second position thereof, said adjusting means having a plurality of depressions around the periphery thereof for contacting said locking elements when said locking elements are in the unlocked position thereof, whereby rotation of the guard means causes rotation of the adjusting means which causes rotation of said housing and whereby the opening in the housing can be aligned with the shaft for placing the housing over the shaft.

2. The torque transmitting coupling of claim 1 including means operable in response to the removal of said shaft from said opening for holding said locking elements in the unlocked position thereof whereby said shaft can be re-inserted into the opening.

3. The coupling of claim 2 wherein said holding means comprises a member disposed within said opening and movable within said opening from a first position holding said locking elements in said unlocked position to a second position allowing said locking elements to move to a locking position.

4. The coupling of claim 3 wherein said holding means further comprises means for biasing said member to said first position, said member being pushed to said second position by said shaft when said shaft is inserted in said opening and following said shaft when the housing moves over the shaft to move from the second to the first position thereof when said housing is removed from the shaft whereby said holding means holds said locking elements in the unlocked position when the shaft is not in the opening and allows said locking elements to move to the locked position when said shaft is disposed within said opening.

5. The coupling of claim 4 wherein said holding means member holds at least one of said locking elements into at least one of said depressions in the adjusting means when the shaft is not in the opening in the housing, whereby the guard means is prevented from rotating with respect to the adjusting means, whereby rotation of the guard means causes rotation of the adjusting means, which causes like rotation of the housing because of the force of the adjusting means pushing on at least one of said locking elements.

6. The coupling of claim 5 wherein said depressions comprise arcuate cuts out of an inner periphery of a washer-like member.

7. The coupling of claim 5 wherein said depressions are formed by a plurality of longitudinally extending fingers disposed about the inner periphery of said adjusting means.

8. The coupling of claim 5 wherein said adjusting means is integral with said guard means.

9. The coupling of claim 5 wherein said adjusting means depressions comprise longitudinal grooves formed about an inner periphery of said adjusting means.

10. The coupling of claim 9 wherein said longitudinal grooves are arcuate in cross sectional shape and the axes of such arcuate shapes being parallel to the axis of said opening in the housing.

* * * * *